United States Patent
Tanaka

(10) Patent No.: US 12,028,646 B2
(45) Date of Patent: Jul. 2, 2024

(54) ELECTRO-OPTICAL DEVICE AND ELECTRONIC APPARATUS

(71) Applicant: SEIKO EPSON CORPORATION, Tokyo (JP)

(72) Inventor: Nobutaka Tanaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/522,836

(22) Filed: Nov. 29, 2023

(65) Prior Publication Data

US 2024/0179269 A1    May 30, 2024

(30) Foreign Application Priority Data

Nov. 30, 2022    (JP) .................................. 2022-191191

(51) Int. Cl.
| | | |
|---|---|---|
| G02F 1/1333 | (2006.01) | |
| G02F 1/1335 | (2006.01) | |
| G02F 1/1339 | (2006.01) | |
| H04N 5/74 | (2006.01) | |

(52) U.S. Cl.
CPC ..... H04N 5/7441 (2013.01); G02F 1/133305 (2013.01); G02F 1/133382 (2013.01); G02F 1/133512 (2013.01); G02F 1/1339 (2013.01)

(58) Field of Classification Search
CPC ............. G02F 1/1333; G02F 1/133302; G02F 1/133305; G02F 1/133382; G02F 1/133512; G02F 1/1343; G02F 1/1345; G02F 1/1339; G02F 1/136286
See application file for complete search history.

(56) References Cited

U.S. PATENT DOCUMENTS

2004/0036834 A1    2/2004  Ohnishi et al.
2008/0309865 A1*  12/2008  Sugita ............... G02F 1/133382
                                                   349/149

FOREIGN PATENT DOCUMENTS

| JP | H09-096824 A | 4/1997 |
| JP | 2004-139018 A | 5/2004 |
| JP | 2010-276909 A | 12/2010 |

* cited by examiner

*Primary Examiner* — Thoi V Duong
(74) *Attorney, Agent, or Firm* — Oliff PLC

(57) ABSTRACT

An electro-optical device includes an element substrate, a liquid crystal, and a counter substrate provided opposite to the element substrate via the liquid crystal, wherein the counter substrate includes a light blocking film disposed outside a display region in plan view, and a heater overlapping with the light blocking film in plan view and provided along the display region.

12 Claims, 13 Drawing Sheets

ELECTRO-OPTICAL DEVICE AND ELECTRONIC APPARATUS

The present application is based on, and claims priority from JP Application Serial Number 2022-191191, filed Nov. 30, 2022, the disclosure of which is hereby incorporated by reference herein in its entirety.

BACKGROUND

1. Technical Field

The present disclosure relates to an electro-optical device and an electronic apparatus.

2. Related Art

For example, in a liquid crystal panel using a liquid crystal as an electro-optical layer, when a temperature of the liquid crystal is low, an optical response is reduced. Thus, a liquid crystal panel is known in which a heater is incorporated and the temperature of the liquid crystal is increased by heat generated by the heater to improve the optical response (see, for example, JP-A-2010-276909). Specifically, the liquid crystal panel described in JP-A-2010-276909 includes a liquid crystal sandwiched between a first substrate and a second substrate, a display region in plan view, and a light blocking region (picture frame region) defined outside the display region, wherein a heater is disposed in the display region and the picture frame region of the second substrate.

However, the technique described in JP-A-2010-276909 has a problem in that uneven heat generation is likely to occur. When the uneven heat generation occurs, a difference in the optical response occurs in the display region, which is likely to lead to a decrease in display quality of a moving image in particular.

In view of such circumstances, an aspect of the present disclosure is to provide a technique in which the uneven heat generation is less likely to occur when the temperature is increased.

SUMMARY

In order to solve the above problems, an electro-optical device according to one aspect of the present disclosure includes a first substrate, an electro-optical layer, and a second substrate disposed opposite to the first substrate via the electro-optical layer, wherein the second substrate includes a light blocking member disposed outside a display region in plan view, and a heating member overlapping with the light blocking member in plan view, the heating member including at least a first heating portion disposed along one side of the second substrate and a second heating portion disposed along another side opposite to the one side of the second substrate.

DESCRIPTION OF EMBODIMENTS

An electro-optical device according to exemplary embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

First Exemplary Embodiment

Figure 1:
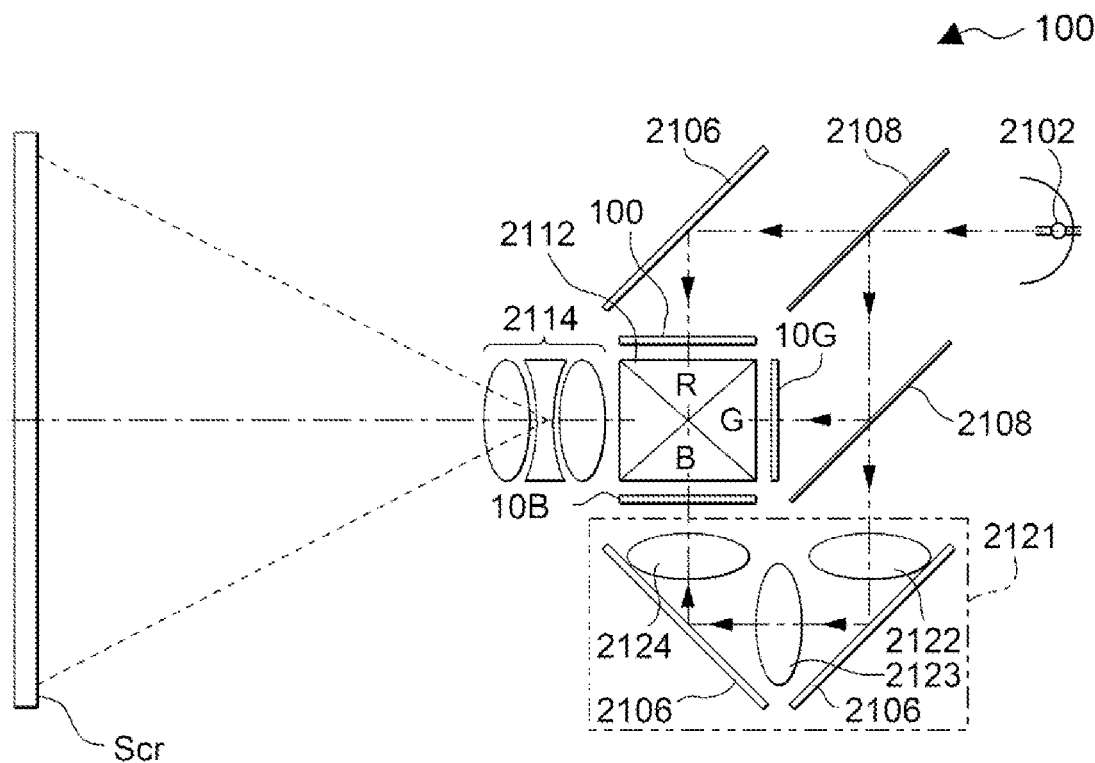
FIG. 1 is a diagram illustrating an optical configuration of a projection-type display apparatus to which an electro-optical device according to a first exemplary embodiment is applied.

FIG. 1 is a diagram illustrating an optical configuration of a projection-type display apparatus 100 to which an electro-optical device according to a first exemplary embodiment is applied. As illustrated in the drawing, the projection-type display apparatus 100 includes electro-optical devices 10R, 10G, and 10B. Further, the projection-type display apparatus 100 is provided with a lamp unit 2102 including a white light source such as a halogen lamp. Projection light emitted from the lamp unit 2102 is separated into three primary colors of red (R), green (G), and blue (B) by three mirrors 2106 and two dichroic mirrors 2108. Of the light of the primary colors, light of R is incident on the electro-optical device 10R, light of G is incident on the electro-optical device 10G, and light of B is incident on the electro-optical device 10B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

In the exemplary embodiment, the electro-optical device 10R is a liquid-crystal panel having a plurality of pixel circuits. Each of the plurality of pixel circuits includes a liquid crystal element. The liquid crystal element of the electro-optical device 10R is driven based on a data signal corresponding to R as will be described below, and has a transmittance corresponding to an effective value of a voltage of the data signal. Therefore, in the electro-optical device 10R, the transmittance of the liquid crystal element is individually controlled, so that a transmitted image of R is generated. Similarly, in the electro-optical device 10G, a transmitted image of G is generated based on a data signal corresponding to G, and in the electro-optical device 10B, a transmitted image of B is generated based on a data signal corresponding to B.

The transmitted images of the respective colors generated by the electro-optical devices 10R, 10G, and 10B are incident on a dichroic prism 2112 from three directions. At the dichroic prism 2112, the light of R and the light of B are refracted at 90 degrees, whereas the light of G travels in a straight line. Thus, the dichroic prism 2112 combines the images of the respective colors. The combined image formed by the dichroic prism 2112 is incident on a projection lens 2114.

The projection lens 2114 enlarges and projects the combined image formed by the dichroic prism 2112 onto a screen Scr.

The transmitted images formed by the electro-optical devices 10R and 10B are emitted after being reflected by the dichroic prism 2112, whereas the transmitted image formed by the electro-optical device 10G travels straight and is emitted. Therefore, the transmitted images by the electro-optical devices 10R and 10B are in a relationship of being laterally inverted with respect to the transmitted image of the electro-optical device 10G.

Figure 2:
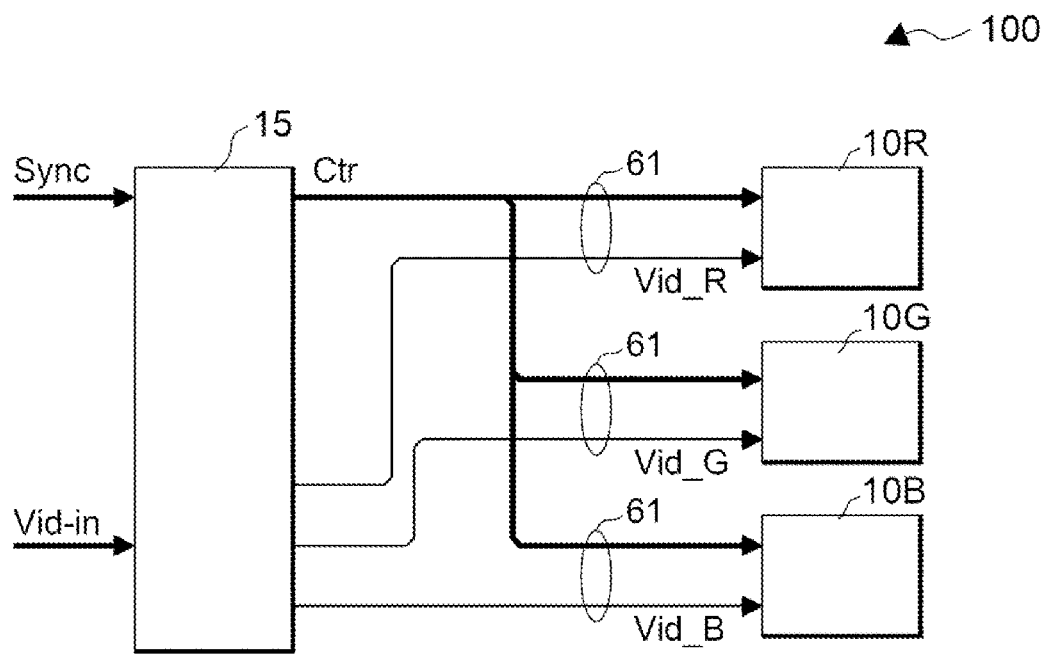
FIG. 2 is a block diagram illustrating an electrical configuration of a drive system in the projection-type display apparatus.

FIG. 2 is a block diagram illustrating a configuration for controlling display in the electrical configuration of the projection-type display apparatus 100. As illustrated in the drawing, the projection-type display apparatus 100 includes the above-described electro-optical devices 10R, 10G, and 10B and a display control circuit 15.

Video data Vid-in is supplied to the display control circuit 15 in synchronization with a synchronization signal Sync from a higher-level device such as a host device (not illustrated). The video data Vid-in designates a gray scale level of a pixel in an image to be displayed for each of RGB, for example, by 8 bits.

In the projection-type display apparatus 100, the color image projected on the screen Scr is expressed by combining the transmitted images of the electro-optical devices 10R, 10G, and 10B as described above. Therefore, a pixel which is a minimum unit of a color image can be divided into a red sub-pixel by the electro-optical device 10R, a green sub-pixel by the electro-optical device 10G, and a blue sub-pixel by the electro-optical device 10B. However, regarding the sub-pixels in the electro-optical devices 10R, 10G, and 10B, when it is not necessary to specify the color, or when only brightness is a problem, etc., it is not necessary to describe the sub-pixels. Therefore, in this description, a display unit in the electro-optical devices 10R, 10G, and 10B is simply referred to as a pixel.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel in the video data Vid-in.

The display control circuit 15 divides the video data Vid-in from the higher-level device into RGB components, converts the RGB components into analog voltage data signals, and supplies the analog voltage data signals to the electro-optical devices 10R, 10G, and 10B. In detail, the display control circuit 15 converts the R component of the video data Vid-in into an analog signal, and supplies the analog signal as a data signal Vid-R to the electro-optical device 10R via a flexible printed circuits (FPC) substrate 61. Similarly, the display control circuit 15 converts the G component of the video data Vid-in into an analog signal and supplies the analog signal as a data signal Vid-G to the electro-optical device 10G via the FPC substrate 61, and converts the B component into an analog signal and supplies the analog signal as a data signal Vid-B to the electro-optical device 10B via the FPC substrate 61.

The display control circuit 15 sequentially supplies the data signals Vid R, Vid G, and Vid B via the FPC substrate 61 in synchronization with a control signal Ctr for controlling the driving of the electro-optical devices 10R, 10G, and 10B.

Next, the electro-optical devices 10R, 10G, and 10B will be described. The electro-optical devices 10R, 10G, and 10B are different only in the color of incident light, that is, the wavelength, and otherwise have the same structure. Therefore, the electro-optical devices 10R, 10G, and 10B are denoted by a reference numeral 10 and will be generally described without specifying the color.

Figure 3:
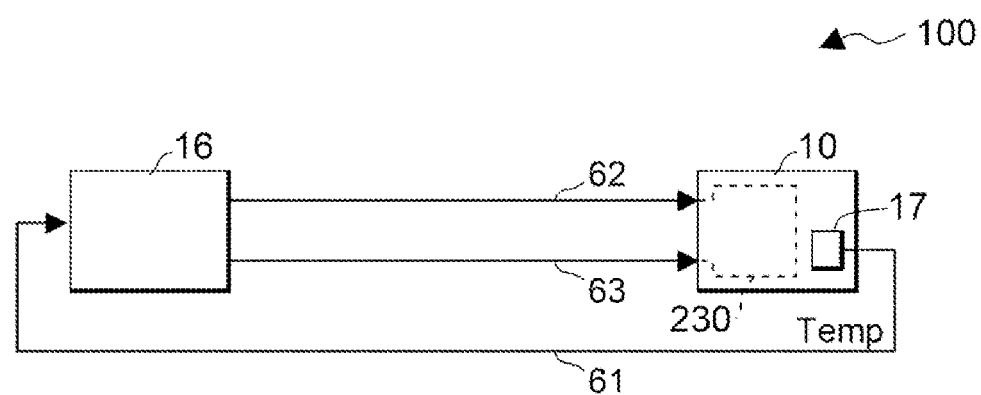
FIG. 3 is a diagram illustrating a configuration for controlling a heater in the projection-type display apparatus.

FIG. 3 is a block diagram illustrating a configuration for controlling heating of the electro-optical device 10. The electro-optical device 10 is provided with a heater 230 and a temperature sensor 17. The heater 230 is an example of a heating member. A temperature control circuit 16 applies a voltage to the heater 230 via FPC substrates 62 and 63.

The temperature sensor 17 detects a temperature of the electro-optical device 10 and outputs information Temp indicating the temperature as a detection value. The information Temp is supplied to the temperature control circuit 16 via an FPC substrate different from the FPC substrates 62 and 63, for example, an FPC substrate 61.

The temperature control circuit 16 controls the voltage applied to the heater 230 so that the temperature indicated by the information Temp becomes a target temperature. Specifically, if the temperature indicated by the information Temp is lower than the target temperature, the temperature control circuit 16 increases the voltage applied to the heater 230.

The target temperature is a temperature suitable for use of the electro-optical device 10, and is set in advance in the temperature control circuit 16. Further, the fluctuation of the voltage applied to the heater 230 acts as a noise source. Thus, the temperature control circuit 16 controls the voltage applied to the heater 230 at a constant voltage, and switches the applied voltage in a stepwise manner, for example, every minute in accordance with the temperature indicated by the information Temp.

Figure 4:
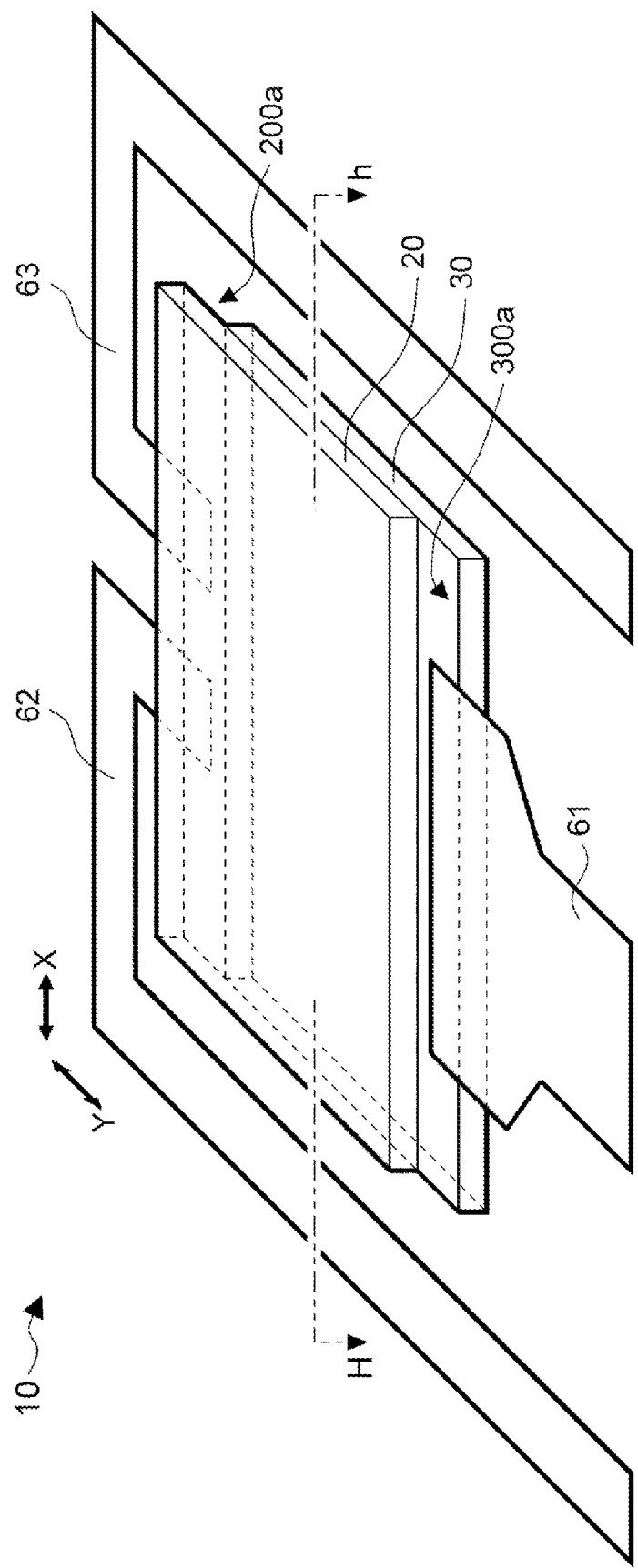
FIG. 4 is a perspective view illustrating the electro-optical device.
Figure 5:
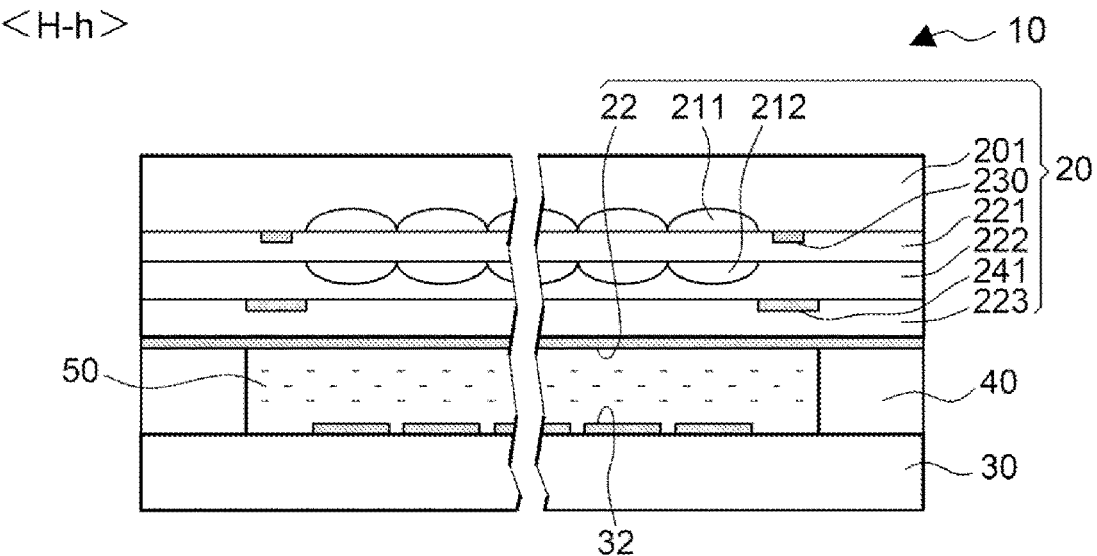
FIG. 5 is a cross-sectional view illustrating a structure of the electro-optical device.

FIG. 4 is a perspective view illustrating an appearance of the electro-optical device 10, and FIG. 5 is a cross-sectional view taken along a line H-h in FIG. 4. In addition, the line H-h is a virtual line for cutting, along the X-axis, a region where a counter substrate 20 and an element substrate 30 overlap with each other in the electro-optical device 10.

As illustrated in FIG. 5, in the electro-optical device 10, the counter substrate 20 at which a common electrode 22 is provided and the element substrate 30 at which a pixel electrode 32 is provided are bonded to each other by a sealing material 40, such that the electrode forming surfaces face each other while maintaining a constant gap, and a liquid crystal 50 is sealed in the gap.

The element substrate 30 is an example of a first substrate, the counter substrate 20 is an example of a second substrate, and the liquid crystal 50 is an example of an electro-optical layer.

As illustrated in FIG. 4, in the exemplary embodiment, the counter substrate 20 and the element substrate 30 have the same length of sides along the X-axis, but are bonded to each other to be shifted from each other along the Y-axis. Thus, the counter substrate 20 is provided with a protruding portion 200a which protrudes from the element substrate 30, and the element substrate 30 is provided with a protruding portion 300a which protrudes from the counter substrate 20.

Note that the Y-axis does not define the orientation in the direction in which the data line extends in the electro-optical device 10, and runs along a short side of a display region described below. The X-axis, which will be described below, intersects the Y-axis in plan view, and does not define the orientation in the direction in which the scanning line extends in the electro-optical device 10. The X-axis runs along a long side of the display region.

In addition, in the present description, the plan view means that the substrate is viewed from a direction perpendicular to the substrate surface, that is, a thickness direction of the substrate. The cross-sectional view means that the substrate is viewed by being cut in the direction perpendicular to the substrate surface.

As each of the counter substrate 20 and the element substrate 30, a base material having optical transparency and insulation properties, such as glass or quartz, is used. A plurality of terminals (not illustrated) are provided at the protruding portion 300a, and one end of the flexible printed circuits (FPC) substrate 61 is coupled to the terminals. The FPC substrate 61 is an example of a first flexible substrate.

The other end of the FPC substrate 61 is coupled to the display control circuit 15 and the temperature control circuit 16. Accordingly, the data signal and the control signal described above are supplied from the display control circuit 15 to the electro-optical device 10, and the information Temp indicating the temperature is supplied from the electro-optical device 10 to the temperature control circuit 16.

The protruding portion 200a is provided with two terminals coupled to the heater 230, and one end of each of the FPC substrates 62 and 63 is coupled thereto. The other end of the FPC substrates 62 and 63 are coupled to the temperature control circuit 16. Accordingly, a voltage controlled by the temperature control circuit 16 is applied to the heater 230 via the FPC substrates 62 and 63. The FPC substrates 62 and 63 are examples of a second flexible substrate.

Each of the FPC substrates 62 and 63 has a configuration in which bending of 90 degrees is repeated twice. This is because the temperature control circuit 16 is provided on the same side as the display control circuit 15 with respect to the electro-optical device 10.

In the electro-optical device 10, light from the lamp unit 2102 is incident on the counter substrate 20 and is emitted from the element substrate 30.

Figure 6:
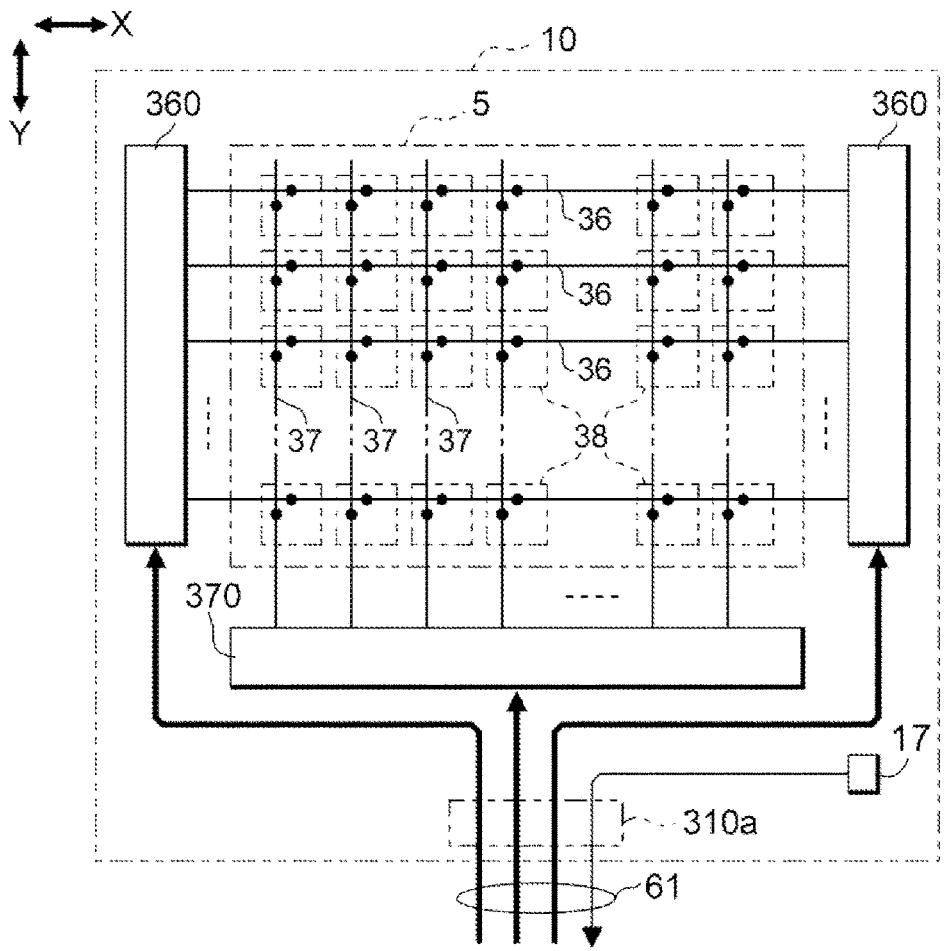
FIG. 6 is a block diagram illustrating an electrical configuration of the electro-optical device.

Here, for convenience, an electrical configuration of the electro-optical device 10 will be described. FIG. 6 is a block diagram illustrating an electrical configuration of the electro-optical device 10.

In the element substrate 30 of the electro-optical device 10, a scanning line drive circuit 360 and a data line drive circuit 370 are provided on the periphery of the display region 5.

In detail, a plurality of scanning lines 36 are provided extending along the X-axis on the element substrate 30. A plurality of data lines 37 extend along the Y-axis and are provided to be electrically insulated from the scanning lines 36. Pixel circuits 38 are provided in a matrix corresponding to the intersections of the plurality of scanning lines 36 and the plurality of data lines 37.

When the number of scanning lines 36 is m and the number of data lines 37 is n, the pixel circuits 38 are arranged in a matrix of m rows and n columns. m and n are each an integer of 2 or greater. In the scanning lines 36 and the pixel circuits 38, in order to distinguish the rows of the matrix, the rows may be referred to as first, second, third, . . . , (m−1)-th, and m-th rows in order from the top in the drawing. Similarly, in the data line 37 and the pixel circuits 38, in order to distinguish the columns of the matrix, the columns may be referred to as first, second, third, . . . , (n−1)-th, and n-th columns in order from the top in the drawing.

The scanning line drive circuit 360 selects the scanning lines 36 one by one in the order of, for example, the first, second, third, . . . , and m-th rows according to the control signal Ctr from the display control circuit 15, and sets the scanning signal to the selected scanning line 36 to the H level. Note that the scan line driver circuit 360 sets scan signals to the scan lines 36 other than the selected scan line 36 to the L level.

The data line drive circuit 370 latches the data signal supplied from the display control circuit 15 for one row, and outputs the data signal to the pixel circuit 38 located on the scanning line 36 through the data line 37 in a period during which the scanning signal to the scanning line 36 is at the H level.

A terminal for supplying the control signal Ctr to the scanning-line drive circuit 360, a terminal for supplying a data signal, etc. to the data line drive circuit 370, and a terminal for supplying information Temp from the temperature sensor 17 to the temperature control circuit 16 are provided in a region 310a in the protruding portion 300a. The terminal provided in the region 310a is an example of a first coupling portion.

Figure 7:
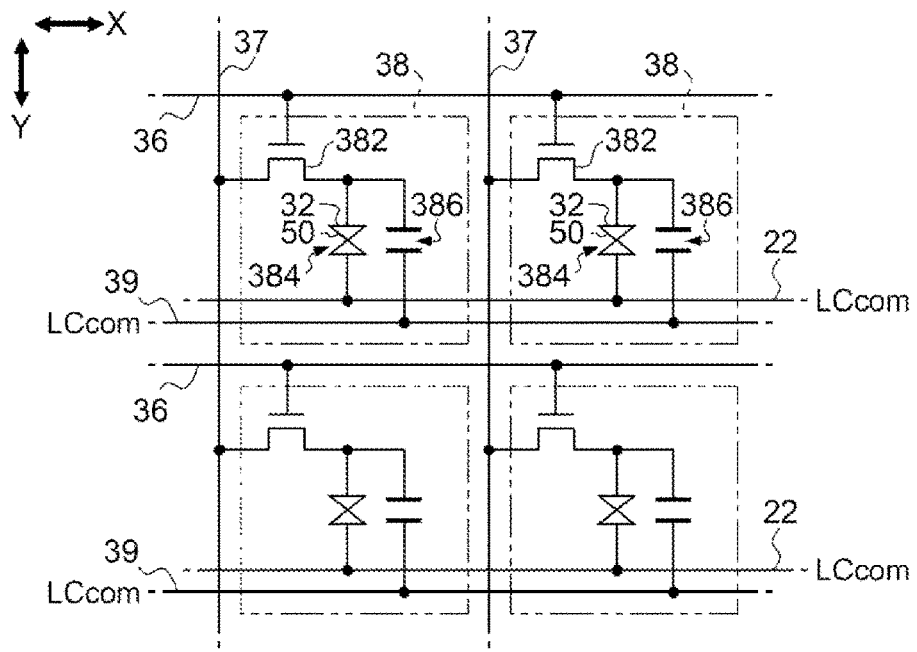
FIG. 7 is a diagram illustrating a configuration of a pixel circuit in the electro-optical device.

FIG. 7 is a diagram illustrating an equivalent circuit of the pixel circuits 38. Note that FIG. 7 illustrates an equivalent circuit of a total of four pixel circuits 38, two in the vertical direction and two in the horizontal direction, corresponding to the intersections of two adjacent scanning lines 36 and two adjacent data lines 37. The pixel circuits 38 have the same circuit configuration.

The pixel circuit 38 includes a transistor 382, a liquid crystal element 384, and a storage capacitor 386. The transistor 382 is, for example, an n-channel thin film transistor. In the pixel circuit 38, the gate electrode of the transistor 382 is electrically coupled to the scanning line 36.

In addition, a source region of the transistor 382 is electrically coupled to the data line 37, and a drain region thereof is electrically coupled to the pixel electrode 32 and one end of the storage capacitor 386.

In the transistor 382, when the direction in which the current flows is reversed, the source region and the drain region are switched. However, in this description, a region electrically coupled to the data line 37 is referred to as a source region, and a region electrically coupled to the pixel electrode 32 is referred to as a drain region.

In addition, in the present description, "electrically coupled" or simply "coupled" means direct or indirect coupling or binding between two or more elements, and for example, includes a case where two or more elements are not directly coupled to each other in an element substrate, but different wirings are coupled to each other through a contact hole.

The common electrode 22 is provided in common to all the pixels to face the pixel electrode 32. A constant voltage LCcom is applied to the common electrode 22 with the passage of time. As described above, the liquid crystal 50 is sandwiched between the pixel electrode 32 and the common electrode 22. Therefore, the liquid crystal element 384, in which the liquid crystal 50 is sandwiched between the pixel electrode 32 and the common electrode 22, is configured for each pixel circuit 38.

The storage capacitor 386 is provided electrically in parallel with the liquid crystal element 384. One end of the storage capacitor 386 is electrically coupled to the pixel electrode 32, and the other end is electrically coupled to a capacitor line 39. A voltage that is constant over time, for example, the same voltage LCcom as the voltage applied to the common electrode 22, is applied to the capacitor line 39.

In the scanning line 36 in which the scanning signal is at the H level, the transistor 382 of the pixel circuit 38 provided corresponding to the scanning line 36 is turned on. When the transistor 382 is turned on, the data line 37 and the pixel electrode 32 are electrically coupled to each other, and thus the data signal supplied to the data line 37 reaches the pixel electrode 32 and one end of the storage capacitor 386 via the transistor 382 that has been turned on. When the scanning line 36 is at the L level, the transistor 382 is turned off, but the voltage of the data signal that has reached the pixel electrode 32 is held by the liquid crystal element 384 and the storage capacitor 386.

As is well known, in the liquid crystal element 384, the alignment of liquid crystal molecules changes in accordance with an electric field generated by the pixel electrode 32 and the common electrode 22. Therefore, the liquid crystal element 384 has a transmittance corresponding to the effective value of the applied voltage.

Note that in the case where the liquid crystal element 384 is in a normally black mode, the transmittance increases as the voltage applied to the liquid crystal element 384 increases.

The operation of supplying the data signal to the pixel electrode 32 of the liquid crystal element 384 is performed in the order of the first, second, third, . . . , and m-th rows in one vertical scanning period. Accordingly, a voltage corresponding to the data signal is held in each of the liquid crystal elements 384 of the pixel circuits 38 arranged in m rows and n columns, and each of the liquid crystal elements 384 has a target transmittance, and then a transmitted image of a corresponding color is generated by the liquid crystal elements 384 arranged in m rows and n columns.

In this way, the transmitted image is generated for each of RGB, and the color image obtained by combining RGB is projected onto the screen Scr.

In the electro-optical device 10, a region where a transmitted image is generated is a region where the pixel electrodes 32 and the common electrodes 22 arranged in a matrix overlap with each other in plan view. Therefore, the display region 5 is a region where the pixel electrodes 32 and the common electrodes 22 arranged in a matrix overlap with each other in plan view.

The projection-type display apparatus 100 may be used not only indoors but also outdoors. The optical response of the liquid crystal element 384, specifically, a change characteristic of the transmittance with respect to a change in voltage applied to the liquid crystal element 384, decreases as the temperature decreases. Thus, in the present exemplary embodiment, the heater 230 is provided to heat the liquid crystal element 384, in particular, the liquid crystal 50, in order to prevent the optical response from being lowered even when the outside air temperature is lowered.

When the liquid crystal 50 of the display region 5 is non-uniformly heated by the heater 230, the optical response varies in the display region 5, and particularly, the display quality of a moving image is decreased. Therefore, in the present exemplary embodiment, a configuration is adopted in which the heater 230 is provided at a position which is the outer peripheral edge of the display region 5 and overlaps with a picture frame (parting) in plan view.

Figure 8:
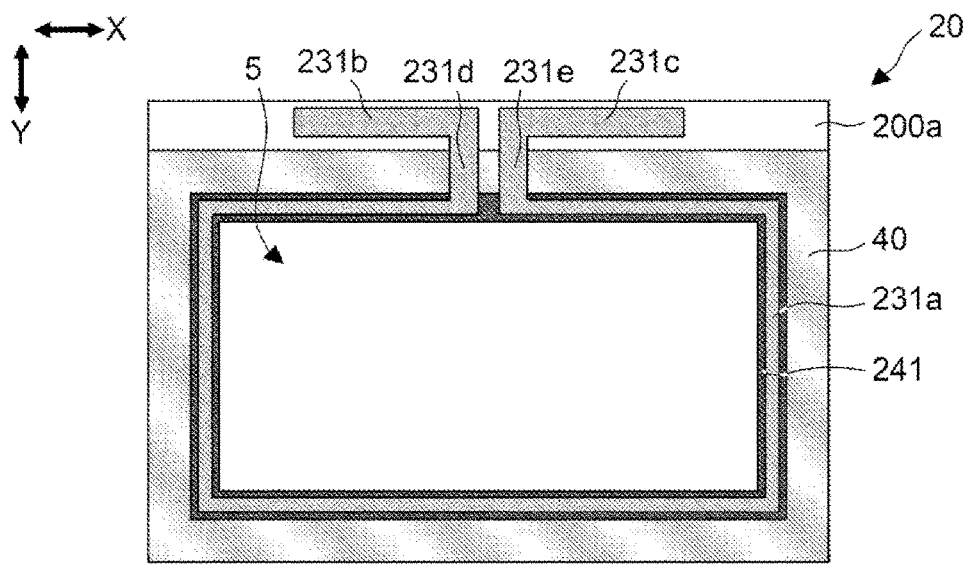
FIG. 8 is a plan view illustrating a counter substrate of the electro-optical device.
Figure 8:
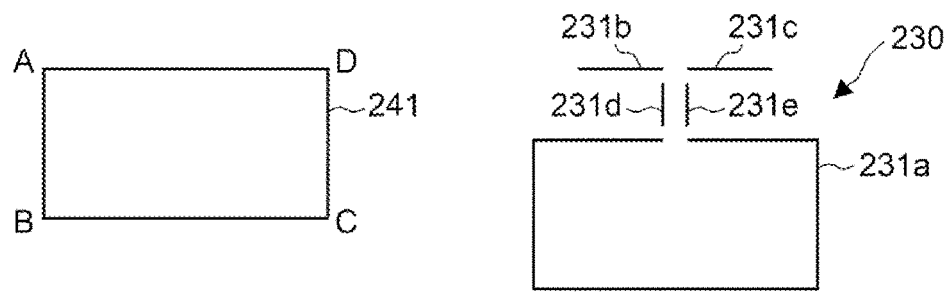

FIG. 8 is a plan view illustrating the configuration of the heater 230 provided in the electro-optical device 10. For convenience of description, FIG. 8 is a diagram in which the element substrate 30 of the electro-optical device 10 is separated and the counter substrate 20 at which the heater 230 is provided is viewed from a direction in which light from the lamp unit 2102 is incident.

In this manner, the element substrate 30 is separated from the electro-optical device 10, and the counter substrate 20 provided with the heater 230 is viewed from the direction in which light is incident, which is the same as in FIGS. 13, 16, 17, 18, and 20 described below.

In FIG. 8, the sealing material 40 is provided in a frame shape in the periphery of a region overlapping with the element substrate 30 in plan view. A light blocking film 241, which is an example of a light blocking member, is provided in a frame shape inside the sealing material 40. The light blocking film 241 is a picture frame defining the outer peripheral edge of the display region 5, and has a light blocking property.

For convenience of description, it is assumed that the frame of the light blocking film 241 in plan view is simply configured by a rectangle having four sides of sides AB, BC, CD, and DA as illustrated in the lower left column in FIG. 8. Here, the protruding portion 200a is provided outside the side DA.

The scanning line drive circuits 360 are provided to be hidden by two sides AB and CD along the Y-axis of the light blocking film 241. In addition, the data line drive circuit 370 is provided to be hidden by the side BC along the X-axis facing the side DA in the light blocking film 241.

Since the scanning line drive circuits 360 and the data line drive circuit 370 are hidden by the light blocking film 241, it is possible to prevent light which is incident from the counter substrate 20 toward the element substrate 30 from entering a transistor which configures the scanning line drive circuit 360 and the data line drive circuit 370. This prevents the scanning line drive circuit 360 and the data line drive circuit 370 from malfunctioning due to light leakage.

In addition, when an ultraviolet curable resin is used as the sealing material 40, the light blocking film 241 is provided without overlapping with the sealing material 40 in plan view. This is because, when the counter substrate 20 and the element substrate 30 are bonded to each other after the application of the sealing material 40 and ultraviolet rays are irradiated in a direction from the counter substrate 20 toward the element substrate 30 in order to cure the sealing material 40, the curing of the sealing material 40 is not prevented by the light blocking of the light blocking film 241.

The heater 230 is a wiring film obtained by patterning a conductive layer made of aluminum (Al), titanium nitride (TiN), tungsten silicide (WSi), etc. The heater 230 has one end and the other end electrically, and generates heat when a current flows from one of the one end and the other end to the other. In the first exemplary embodiment, the heater 230 has an integrated shape in plan view as illustrated in FIG. 8, but for convenience of description, the heater 230 is substantially divided into a frame portion 231a, coupling portions 231b and 231c, and intersecting portions 231d and 231e, as illustrated in the lower right column of FIG. 8.

In this description, the term "layer" refers to a conductive layer and a wiring layer that are not patterned, and the term "film" refers to a conductive layer and a wiring layer that are patterned.

The frame portion 231a is a portion provided to be narrower than the light blocking film 241 so that the frame portion 231a overlaps with the light blocking film 241, and has one end and the other end. Note that the width of the light blocking film 241 is a dimension in a direction orthogonal to the extending direction of the light blocking film 241.

The coupling portions 231b and 231c are provided at the protruding portion 200a, and the coupling portion 231b is a portion coupled to the FPC substrate 62 and the coupling portion 231c is a portion coupled to the FPC substrate 63. The coupling portions 231b and 231c of the protruding portion 200a are examples of a second coupling portion.

The first exemplary embodiment is an example in which the region 310a of the element substrate 30 is provided at one outer side of the rectangular sealing material 40 overlapping with the counter substrate 20 and the element substrate 30 in plan view, and the coupling portions 231b and 231c of the heater 230 in the counter substrate 20 are provided at the other side excluding the above one side of the rectangular sealing material 40 overlapping with the counter substrate 20 and the element substrate 30 in plan view, wherein the other side faces the one side.

The intersecting portion 231d includes a portion that intersects the sealing material 40 in plan view between the coupling portion 231b and one end of the frame portion 231a. The intersecting portion 231e includes a portion that intersects the sealing material 40 in plan view between the coupling portion 231b and the other end of the frame portion 231a.

The description is returned to FIG. 5. In FIG. 5, the counter substrate 20 has a configuration in which a concave lens 211, the heater 230, an insulating layer 221, a convex lens 212, an insulating layer 222, the light blocking film 241, an insulating layer 223, and the common electrode 22 are provided in this order with respect to a base material 201.

Since FIG. 5 is a cross-sectional view of the electro-optical device 10 taken along the line H-h in FIG. 4, strictly speaking, the heater 230 is the frame portion 231a, but is collectively referred to as the heater 230 in order to illustrate the stacking order.

A set of the concave lens 211 and the convex lens 212 is for making the light from the lamp unit 2102 efficiently incident on the liquid crystal element 384, and is provided in one-to-one correspondence with the pixel circuit 38. A microlens array is constituted by the set of the concave lens 211 and the convex lens 212.

FIG. 5 is an example in which the heater 230 is provided between the concave lens 211 and the convex lens 212 of the microlens array in a cross-sectional view.

In addition, an alignment film is provided at the counter substrate 20 to cover the common electrode 22, but is omitted in FIG. 5. In the element substrate 30, in addition to the pixel electrode 32, an alignment film, the scanning line 36, the data line 37, the scanning line drive circuit 360, etc. are provided, but are omitted in FIG. 5.

Figure 9:
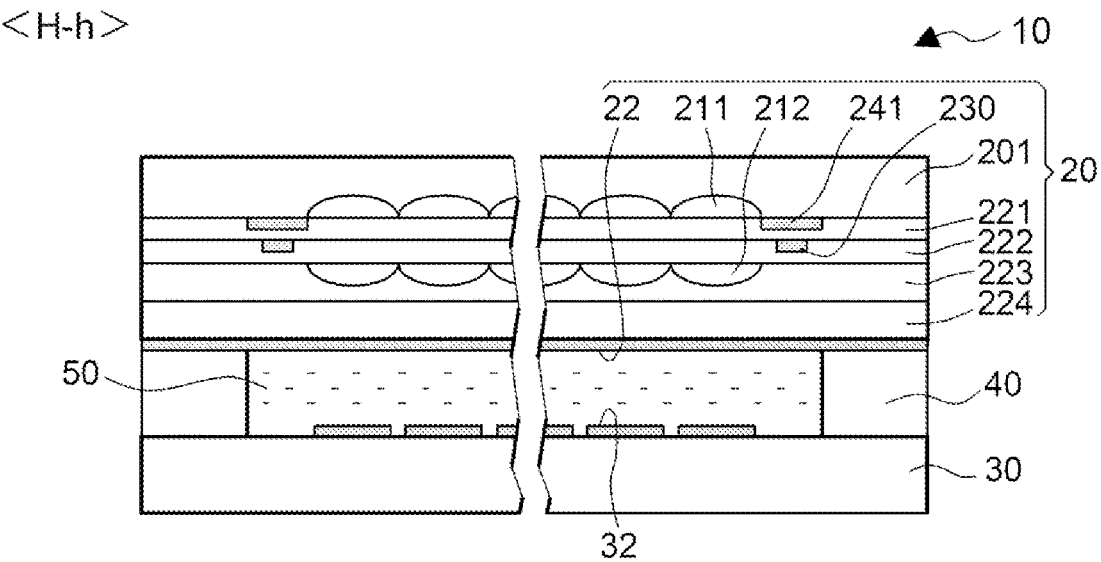
FIG. 9 is a cross-sectional view illustrating a structure of an electro-optical device according to a first modification of the first exemplary embodiment.
Figure 10:
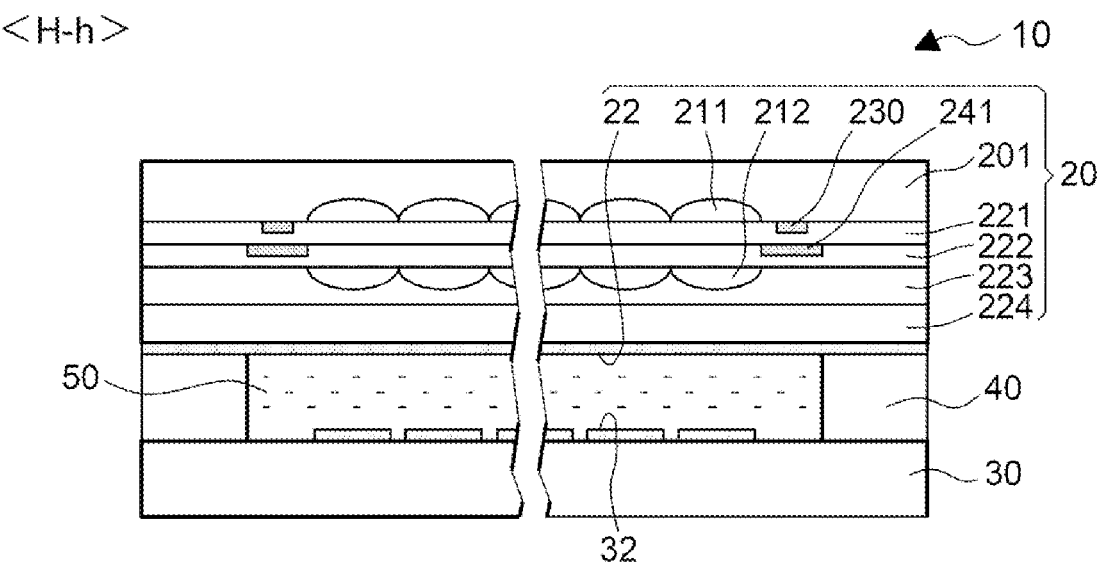
FIG. 10 is a cross-sectional view illustrating a structure of an electro-optical device according to a second modification of the first exemplary embodiment.
Figure 11:
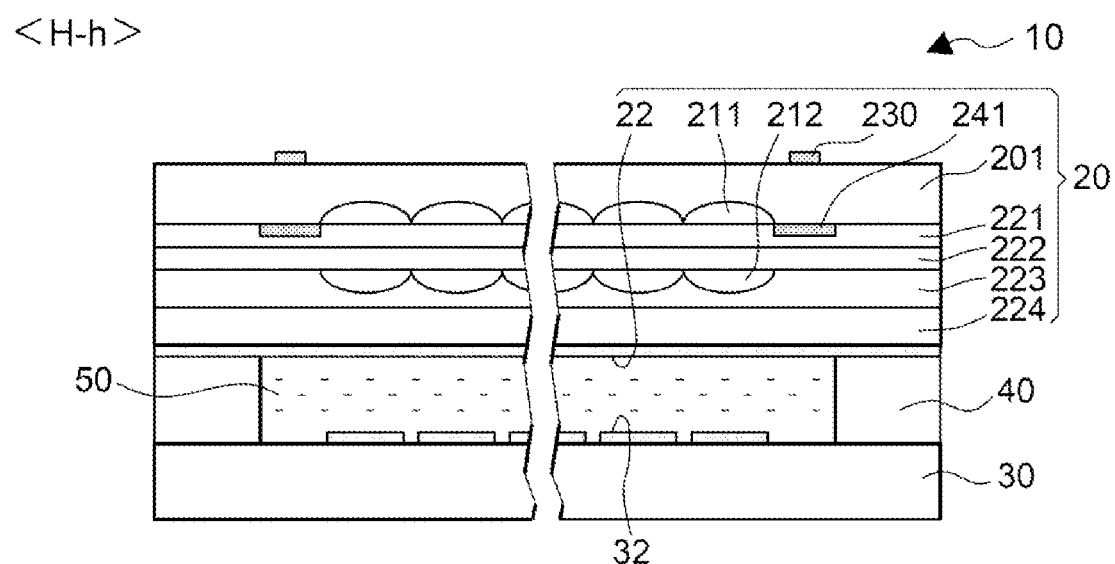
FIG. 11 is a cross-sectional view illustrating a structure of an electro-optical device according to a third modification of the first exemplary embodiment.

The heater 230 may be provided at a position illustrated in FIG. 9, FIG. 10, and FIG. 11, in addition to the position illustrated in FIG. 5 in a cross-sectional view.

FIG. 9 is a cross-sectional view illustrating the structure of the electro-optical device 10 according to a first modification of the first exemplary embodiment. The first modification is an example in which the light blocking film 241 and the heater 230 are provided at positions between the microlens arrays, that is, between the concave lens 211 and the convex lens 212 in a cross-sectional view. In the counter substrate 20 of the first modification, the concave lens 211, the light blocking film 241, the insulating layer 221, the heater 230, the insulating layer 222, the convex lens 212, the insulating layers 223 and 224, and the common electrode 22 are provided in this order at the surface of the base material 201 opposite to the light incident surface.

FIG. 10 is a cross-sectional view illustrating the structure of the electro-optical device 10 according to a second modification of the first exemplary embodiment. The second modification is an example in which the positions of the heater 230 and the light blocking film 241 are reversed from the configuration illustrated in FIG. 9 in a cross-sectional view. In the counter substrate 20 of the second modification, the concave lens 211, the heater 230, the insulating layer 221, the light blocking film 241, the insulating layer 222, the convex lens 212, the insulating layers 223 and 224, and the common electrode 22 are provided in this order at the surface of the base material 201 opposite to the light incident surface.

In the configuration illustrated in FIG. 6, FIG. 9, or FIG. 10, the lower surface of the base material 201 or the lower surface of the insulating layer 221 is exposed in the protruding portion 200a. The coupling portions 231b and 231c of the heater 230 are provided at the exposed portions and are coupled to the FPC substrates 62 and 63, respectively.

FIG. 11 is a cross-sectional view illustrating the structure of the electro-optical device 10 according to a third modification of the first exemplary embodiment. The third modification is an example in which the heater 230 is provided at the light incident surface of the counter substrate 20. In detail, in the third modification, the heater 230 is provided at the incident surface of the base material 201 by patterning, and the concave lens 211, the light blocking film 241, the insulating layers 221 and 222, the convex lens 212, the insulating layers 223 and 224, and the common electrode 22 are provided in this order at the surface opposite to the incident surface of the base material 201.

In the third modification, the protruding portion 200a is not necessary in the counter substrate 200. To be specific, as illustrated in FIG. 12, the coupling portions 231b and 231c in the heater 230 are provided along the same side as the protruding portion 300a in the element substrate 300, for example, and are coupled to one end of the FPC substrates 62 and 63, respectively.

Figure 12:
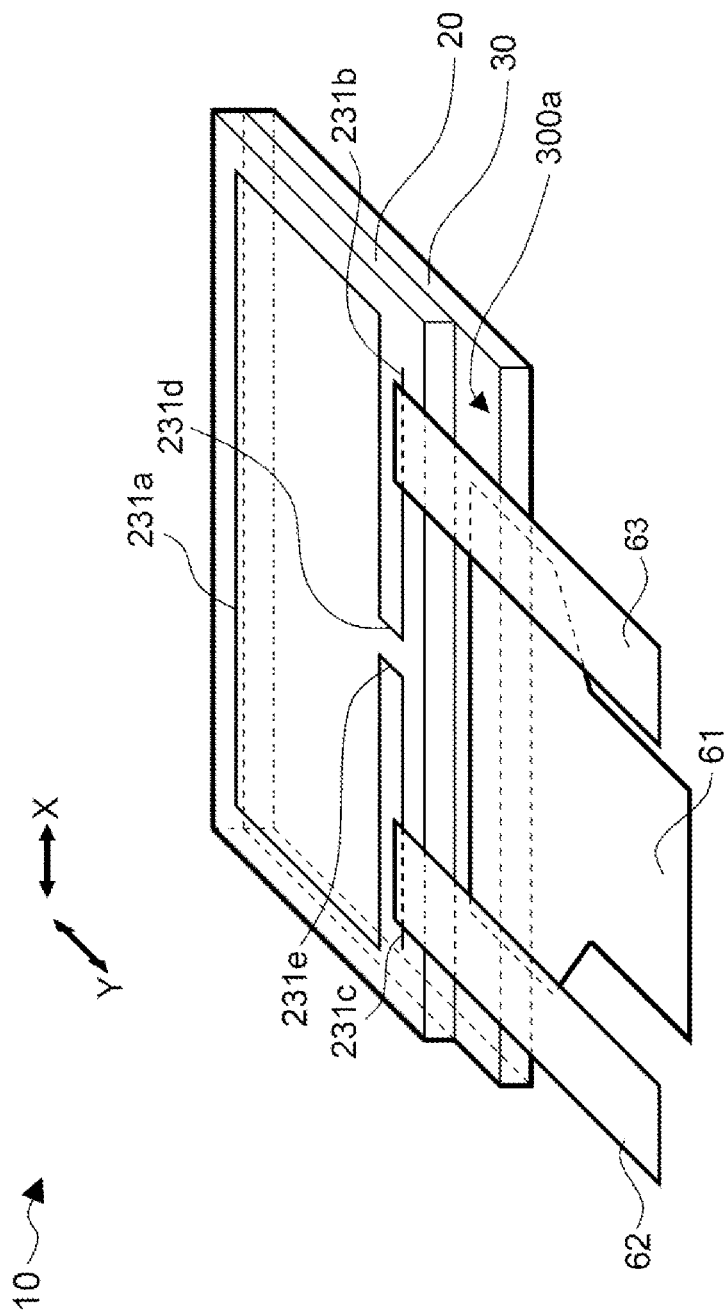
FIG. 12 is a perspective view illustrating the electro-optical device according to the third modification.

In FIG. 12, the shape of the heater 230 in plan view is rotated by 180 degrees with respect to the shape of the heater 230 in FIG. 8.

According to the first exemplary embodiment including the first modification, the second modification, and the third modification, the light blocking film 241 which shields the scanning line drive circuit 360 and the data line drive circuit 370 from light is provided in a frame shape outside the display region 5 and inside the sealing material 40 in plan view. Thus, even when an ultraviolet curable resin is used as the sealing material 40, since the light blocking film 241 does not overlap with the sealing material 40 in plan view, the light blocking film 241 does not hinder the curing of the sealing material 40 due to the irradiation of ultraviolet rays. Therefore, it is possible to suppress the occurrence of a bonding failure between the counter substrate 20 and the element substrate 30.

The frame portion 231a of the heater 230 overlaps with the frame-shaped light blocking film 241 in plan view, and is narrower than the light blocking film 241. Since the heat generated by the frame portion 231a is substantially uniformly generated outside the display region 5, uneven heat generation is unlikely to occur in the display region 5.

Figure 13:
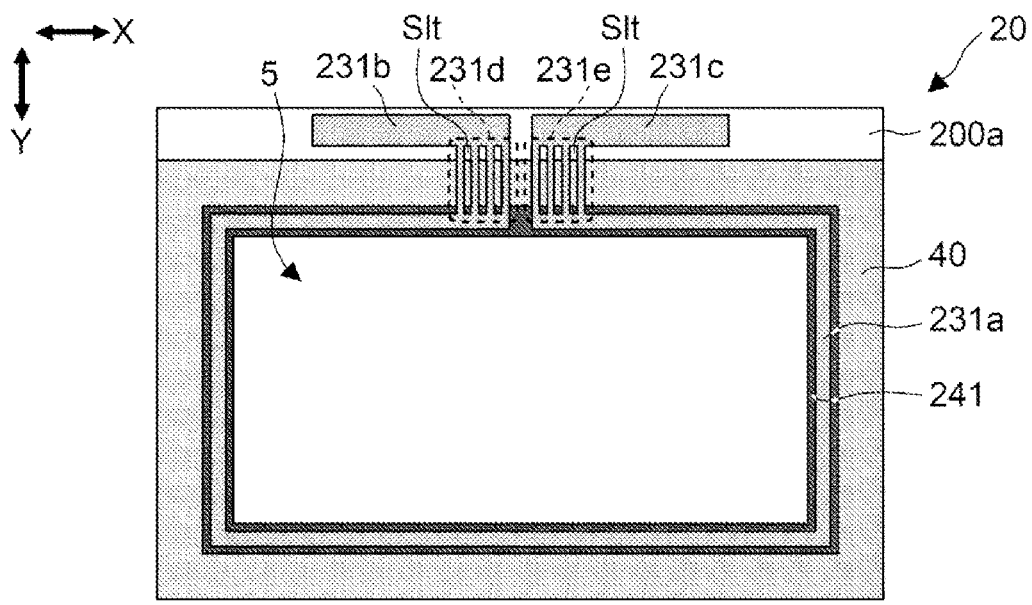
FIG. 13 is a plan view illustrating a counter substrate of an electro-optical device according to a fourth modification of the first exemplary embodiment.

FIG. 13 is a plan view illustrating the counter substrate 20 of the electro-optical device 10 according to a fourth modification of the first exemplary embodiment. The fourth modification is an example in which opening portions Slt are provided at the intersecting portions 231d and 231e of the heater 230.

Figure 14:
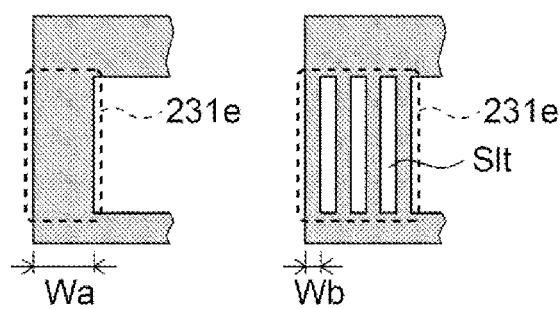
FIG. 14 is a plan view illustrating an intersecting portion of the electro-optical device according to the fourth modification.

In detail, taking the intersecting portion 231e as an example, as illustrated in FIG. 14, a plurality of (three in the drawing) the opening portions Slt are provided at the intersecting portion 231e. In the case where the ultraviolet curable resin is used as the sealing material 40, when the opening portions Slt are provided at the intersecting portion 231e, ultraviolet rays enter the sealing material 40 through the opening portions Slt, so that the curing of the sealing material 40 can be promoted.

The width of the intersecting portion 231e in FIG. 8 is denoted by Wa, as illustrated in the left column of FIG. 14. In addition, as illustrated in the right column, in the intersecting portion 231e in the fourth modification, the line width of the opening portion Slt is set to Wb, and the number of lines of the opening portion Slt in the intersecting portion 231e is set to k (k is an integer of 2 or more). The right column illustrates an example in which the number of lines k is "4".

The widths Wa and Wb and the number of lines k preferably have the following relationship.

$$Wa \leq k \cdot Wb$$

That is, when the sum (k·Wb) of the width of the intersecting portion 231e in the fourth modification is equal to or greater than the width Wa of the intersecting portion 231e in the exemplary embodiment, it is possible to suppress an adverse effect on heat generation due to an increase in resistance value in the coupling portion.

Although the intersecting portion 231e has been described above, the same applies to the intersection 231d.

Figure 15:
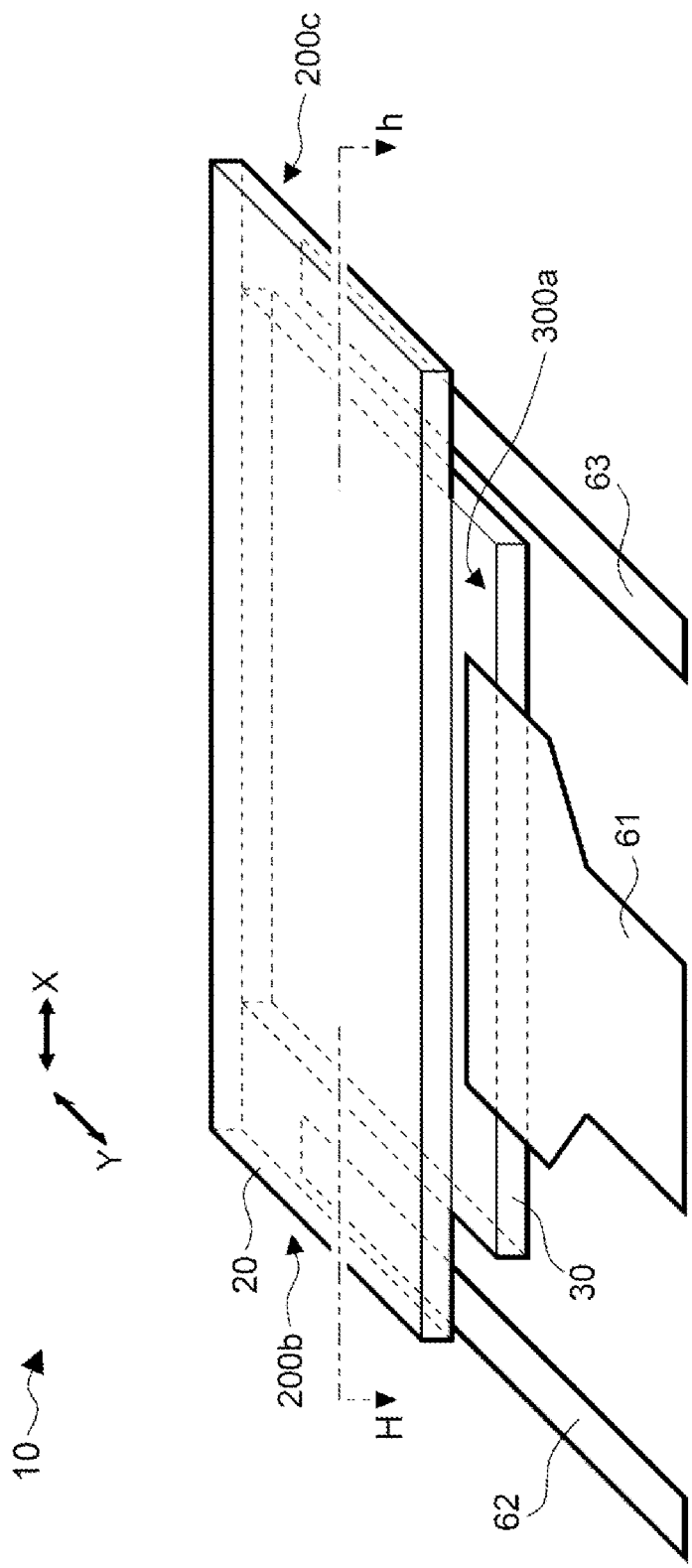
FIG. 15 is a perspective view illustrating an electro-optical device according to a second exemplary embodiment.

Next, the second exemplary embodiment will be described. FIG. 15 is a perspective view illustrating the electro-optical device 10 according to the second exemplary embodiment.

The second exemplary embodiment is an example in which the length of the X-axis in the counter substrate 20 is greater than the length of the X-axis in the element substrate 30, and the protruding portions 200b and 200c protruding from the element substrate 30 are provided at the two short sides of the counter substrate 20.

The second exemplary embodiment is the same as the first exemplary embodiment in that the element substrate 30 is provided with the protruding portion 300a which projects from the counter substrate 20.

Figure 16:
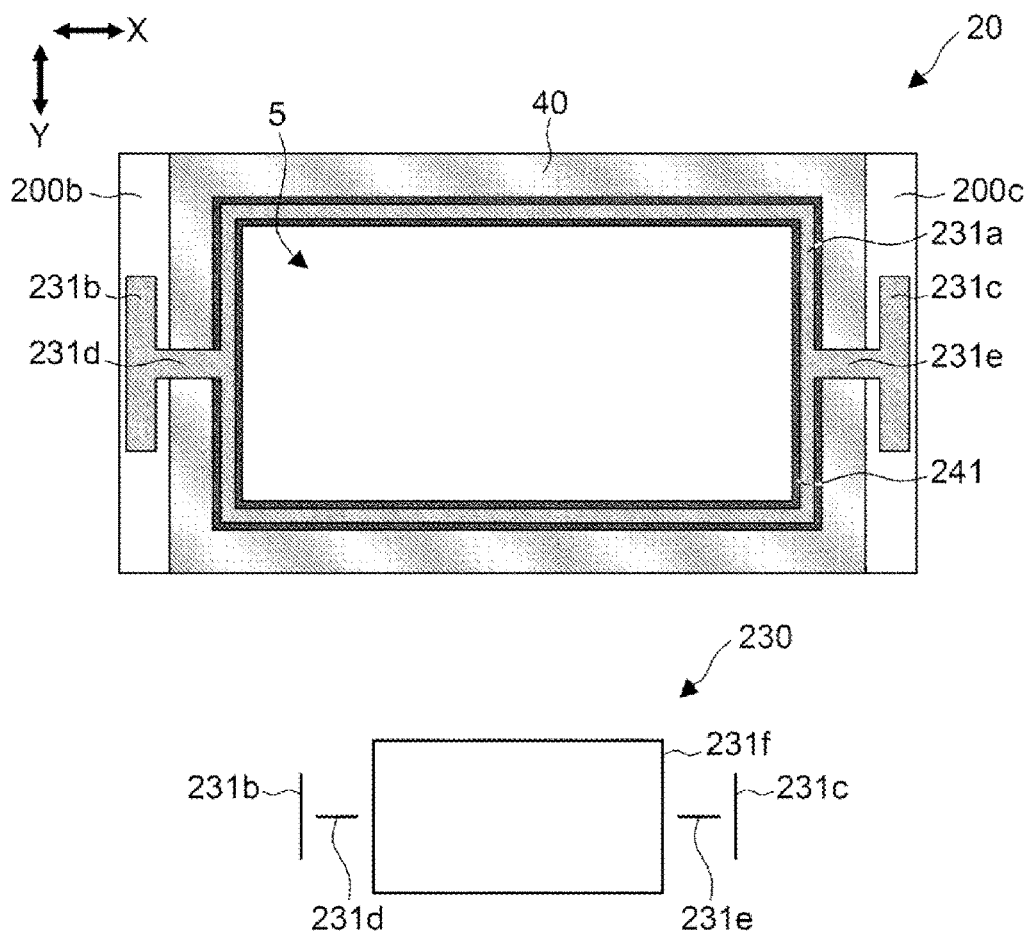
FIG. 16 is a plan view illustrating a counter substrate of the electro-optical device.

FIG. 16 is a plan view illustrating the counter substrate 20 of the electro-optical device 10 according to the second exemplary embodiment. In the second exemplary embodiment, the sealing material 40 is provided in a frame shape in the periphery of a region overlapping with the element substrate 30 in plan view, similarly to the first exemplary embodiment. Similarly to the first exemplary embodiment, as illustrated in the lower left column of FIG. 8, the light blocking film 241 is provided in a frame shape inside the sealing material 40 and outside the display region 5.

Figure 17:
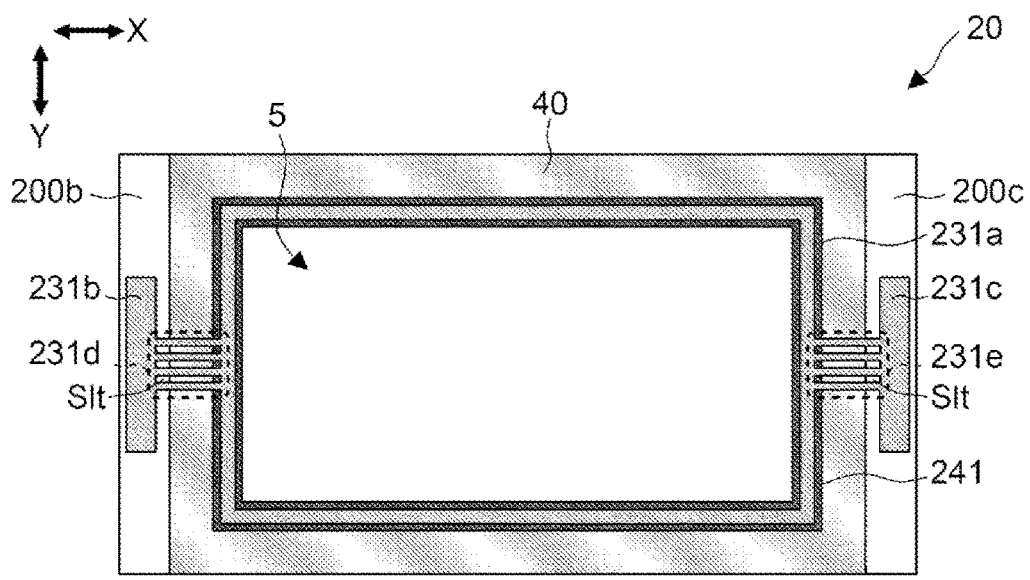
FIG. 17 is a plan view illustrating a counter substrate of an electro-optical device according to a modification of the second exemplary embodiment.

In the second exemplary embodiment, the heater 230 has a shape illustrated in FIG. 17 in plan view, and is substantially divided into the coupling portions 231b and 231c, the intersecting portions 231d and 231e, and the frame portion 231f as illustrated in the lower column of FIG. 17.

The frame portion 231f has a four sided frame shape and is provided to be narrower than the light blocking film 241 to overlap with the light blocking film 241.

In the second exemplary embodiment, the coupling portion 231b is provided at the protruding portion 200b and is coupled to the FPC substrate 62 as illustrated in FIG. 15. Further, the coupling portion 231c is provided at the protruding portion 200c, and is coupled to the FPC substrate 63 as illustrated in FIG. 15.

The intersecting portion 231d is a portion which intersects the sealing material 40 between the coupling portion 231b and the frame portion 231f in plan view, and is a portion which intersects the side AB in the light blocking film 241 of the lower left column in FIG. 8. The intersecting portion 231e is a portion which intersects the sealing material 40 between the coupling portion 231c and the frame portion 231f in plan view, and is a portion that intersects the side CD in the light blocking film 241.

The second exemplary embodiment is an example in which the region 310a of the element substrate 30 is provided at one outer side of the rectangular sealing material 40 overlapping with the counter substrate 20 and the element substrate 30 in plan view, and the coupling portions 231b and 231c of the heater 230 in the counter substrate 20 are provided at the other side excluding the above one side of the rectangular sealing material 40 overlapping with the counter substrate 20 and the element substrate 30 in plan view, wherein the other side is provided at a side that intersect with each of the one sides.

According to the second exemplary embodiment, similarly to the first exemplary embodiment, the frame portion 231a of the heater 230 is provided to overlap with the frame-shaped light blocking film 241 in plan view and to be narrower than the light blocking film 241. Therefore, even when the ultraviolet curable resin is used as the sealing material 40, curing of the sealing material 40 is not prevented by the light blocking film 241, and heat generation by the frame portion 231a uniformly occurs outside the display region 5, and thus it is possible to suppress uneven heat generation in the display region 5.

Further, in the second exemplary embodiment, the path length of the current flowing from one of the coupling portions 231b or 231c to the other is reduced to a half as compared with the first exemplary embodiment, so that the current easily flows. Therefore, when the voltage applied to the coupling portions 231b and 231c is the same as in the first exemplary embodiment and the material of the heater 230 is the same (when the resistivity is the same), the thickness of the heater 230 in the second exemplary embodiment can be reduced to half compared to the first exemplary embodiment, and the same amount of heat generation as in the first exemplary embodiment can be obtained.

FIG. 17 is a plan view illustrating the counter substrate 20 of the electro-optical device 10 according to a modification of the second exemplary embodiment. The modification of the second exemplary embodiment is an example in which opening portions Slt similar to those of the first exemplary embodiment are provided at the intersecting portions 231d and 231e of the heater 230.

When the opening portions Slt are provided at the intersecting portions 231d and 231e as described above, ultraviolet rays enter the sealing material 40 through the opening portions Slt when the counter substrate 20 and the element substrate 30 are bonded to each other, and thus curing of the sealing material 40 can be promoted.

Figure 18:
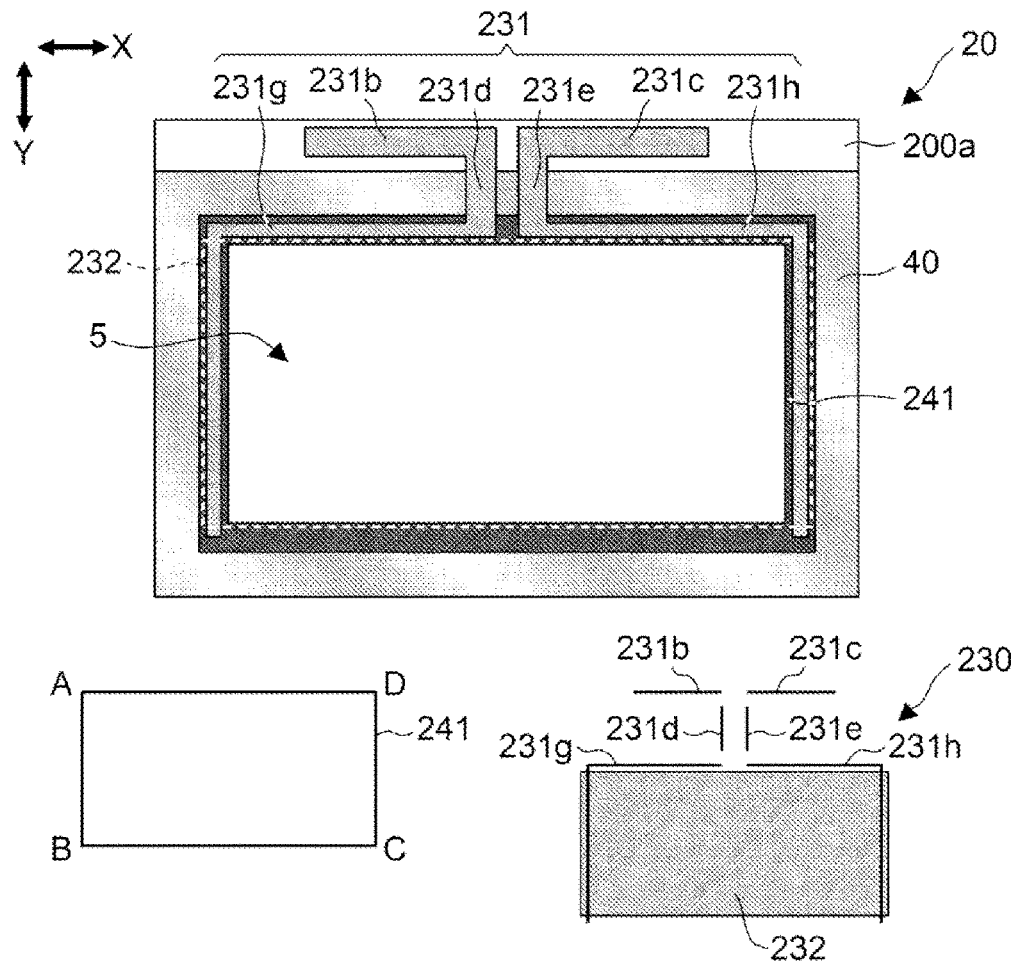
FIG. 18 is a plan view illustrating a counter substrate of an electro-optical device according to a third exemplary embodiment.

FIG. 18 is a plan view illustrating the counter substrate 20 of the electro-optical device 10 according to a third exemplary embodiment. In the third exemplary embodiment, similarly to the first exemplary embodiment and the second exemplary embodiment, the sealing material 40 is provided in a frame shape in the periphery of a region overlapping with the element substrate 30 in plan view. Similarly to the first exemplary embodiment and the second exemplary embodiment, the light blocking film 241 is provided in a frame shape inside the sealing material 40 and outside the display region 5 as illustrated in the lower left column of FIG. 18.

In the third exemplary embodiment, the heater 230 is divided into heater wiring 231 and a heater film 232.

In the third exemplary embodiment, the heater wiring 231 is wiring divided into two electrodes by patterning a conductive film, and for convenience of description, as illustrated in the lower right column of FIG. 18, one of the electrodes is divided into the coupling portion 231b, the intersecting portion 231d, and the frame portion 231g, and the other of the electrodes is divided into the coupling portion 231c, the intersecting portion 231e, and the frame portion 231h.

The frame portion 231g is provided to bend at a right angle at the corner A from substantially the middle point of the side DA of the light blocking film 241 and extend to the point B, and the frame portion 231h is provided to bend at a right angle at the point D from substantially the middle point of the side DA of the light blocking film 241 and extend to the point C.

The heater film 232 in which the outer shape is indicated by a white broken line in FIG. 18 is formed by patterning a conductive layer such as indium tin oxide (ITO) having transparency and conductivity into a rectangular shape. The heater film 232 is electrically coupled to the frame portion 231g and the frame portion 231h.

The heater film 232 is an example of a transparent electrode.

Figure 19:
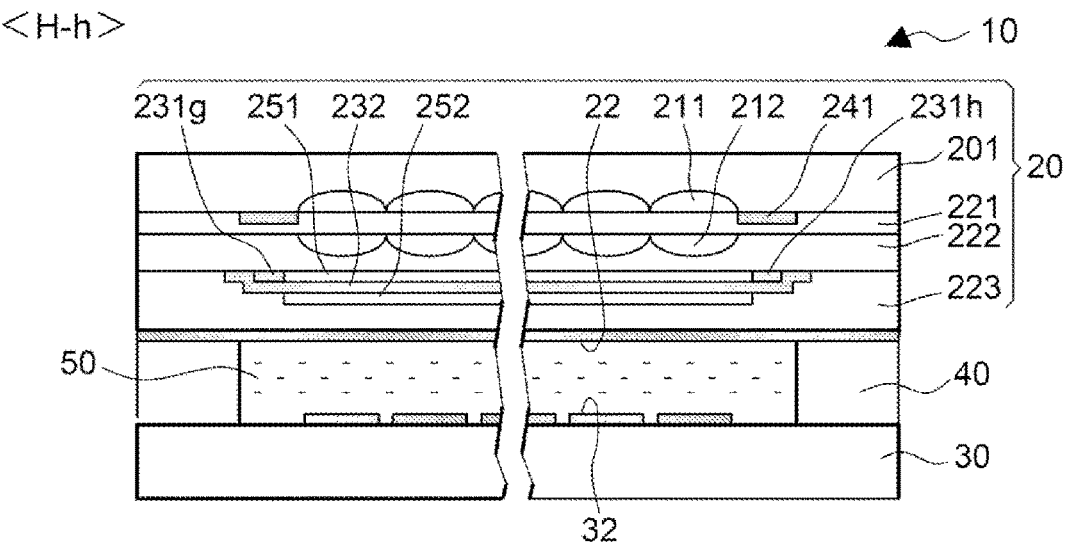
FIG. 19 is a sectional view illustrating a structure of the electro-optical device according to the third exemplary embodiment.

The appearance of the electro-optical device 10 according to the third exemplary embodiment is the same as that of the first exemplary embodiment whose perspective view is illustrated in FIG. 4. FIG. 19 is a cross-sectional view of the electro-optical device 10 according to the third exemplary embodiment taken along the line H-h of FIG. 4.

In the third exemplary embodiment, the counter substrate 20 has a configuration in which the concave lens 211, the light blocking film 241, the insulating layer 221, the convex lens 212, the insulating layer 222, the refractive film 251, the frame portions 231g and 231h, the refractive film 252, the insulating layer 223, and the common electrode 22 are provided in this order with respect to the base material 201.

In this configuration, the refractive film 251 is provided at the light incident surface of the heater film 232, that is, the upper surface in the drawing, and the refractive film 252 is provided at the light emitting surface of the heater film 232, that is, the lower surface in the drawing.

For example, the light incident surface of the heater film 232 is an example of a first surface, and the light emitting surface of the heater film 232 is an example of a second surface.

Among these, the refractive index of the refractive film 251 provided between the heater film 232 and the insulating layer 222 has a value between the refractive index of the heater film 232 and the refractive index of the insulating layer 222. For example, when the refractive index of the heater film 232 is 1.80 and the refractive index of the insulating layer 222 is 1.45, the refractive index of the refractive film 251 is set within the range of 1.45 or more and less than 1.80. In addition, for example, when the refractive index of the heater film 232 is 2.00 and the refractive index of the insulating layer 222 is 1.70, the refractive index of the refractive film 52 is set within the range of 1.70 or more and less than 2.00.

As described above, the refractive index of the refractive film 251 is equal to or higher than the refractive index of the insulating layer 222 and lower than the refractive index of the heater film 232, and is preferably 1.80 or more and less than 2.00.

In a configuration in which the refractive film 251 is not provided, the heater film 232 and the insulating layer 222 are in direct contact with each other in the display region 5. In such a contact configuration, the difference between the refractive index of the heater film 232 and the refractive index of the insulating layer 222 increases, and the amount of reflected light at the interface increases. Therefore, the amount of light passing through the liquid crystal element 384 is reduced, so that the contrast ratio is decreased and the display quality is decreased.

In contrast, in the present exemplary embodiment, since the refractive film 251 is provided between the heater film 232 and the insulating layer 222, the difference in refractive index is reduced, and the amount of reflected light at the interface is reduced. Thus, the amount of light passing through the liquid crystal element 384 is greater than that in a configuration in which the refractive film 251 is not provided, and thus it is possible to suppress a decrease in contrast ratio and to suppress a decrease in display quality.

The refractive index of the refractive film 252 provided between the heater film 232 and the insulating layer 223 is the same as that of the refractive film 251, and has a value between the refractive index of the heater film 232 and the refractive index of the insulating layer 223.

The refractive films 251 and 252 are provided by patterning an insulating layer having insulating properties and transparency, such as a silicon nitride film (SiON), silicon nitride (SiN), or alumina (Al2O3).

In addition, in the third exemplary embodiment, the refractive film 251 is provided at the light incident surface of the heater film 232, and the refractive film 252 is provided at the light emitting surface of the heater film 232, but a configuration may be adopted in which the refractive film is provided at only one of the surfaces. Even in a configuration in which the refractive film is provided at only one of the surfaces, the amount of light reflected at the interface between the surfaces is small, and thus the amount of light is greater than that in a configuration in which the other of the refractive films 251 and 252 is not provided.

According to the third exemplary embodiment, the heater film 232 is electrically coupled to the frame portions 231g and 231h of the heater wiring 231, and the heater film 232 covers the entire surface of the display region 5 in plan view. Thus, it is possible to uniformly generate heat by the heater film 232 over the entire surface of the display region 5 compared to the first exemplary embodiment or the second exemplary embodiment, and thus, it is possible to suppress uneven heat generation in the display region 5.

In addition, in the third exemplary embodiment, as described above, a decrease in contrast ratio is suppressed by the refractive films 251 and 252, and thus it is possible to suppress a decrease in display quality.

Figure 20:
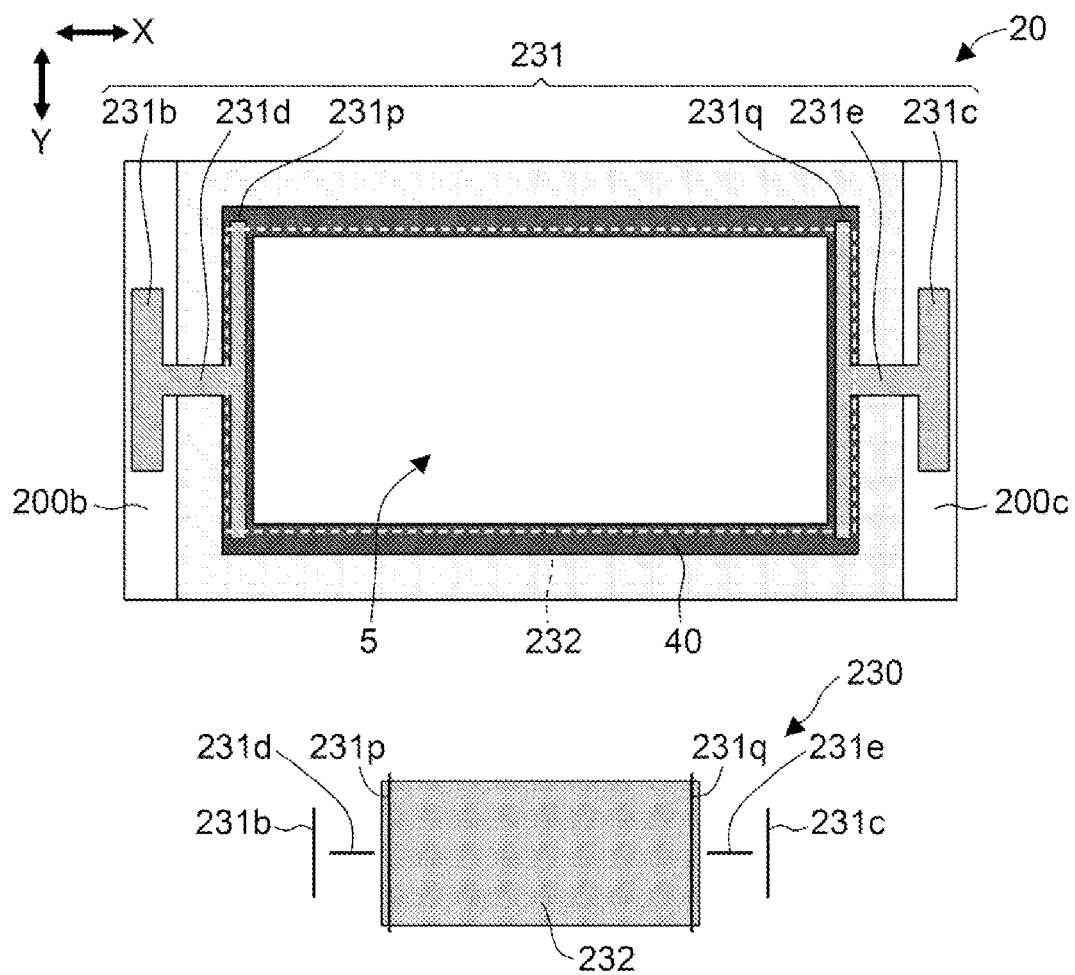
FIG. 20 is a plan view illustrating a counter substrate of an electro-optical device according to a fourth exemplary embodiment.

FIG. 20 is a plan view illustrating the counter substrate 20 of the electro-optical device 10 according to a fourth exemplary embodiment. In the fourth exemplary embodiment, the heater wiring 231 includes the coupling portions 231b and 231c and the intersecting portions 231d and 231e similar to those of the second exemplary embodiment, contact bars 231p and 231q instead of the frame portion 231g of the second exemplary embodiment, and the heater film 232 similar to that of the third exemplary embodiment.

The contact bar 231p overlaps with the side AB of the light blocking film 241 in plan view and is narrower than the light blocking film 241. Similarly, the contact bar 231q overlaps with the side CD of the light blocking film 241 in plan view and is narrower than the light blocking film 241.

In FIG. 20, the heater film 232 having a rectangular outer shape indicated by a white broken line is electrically coupled to the contact bars 231p and 231q.

According to the fourth exemplary embodiment, the heater film 232 is electrically coupled to the contact bars 231p and 231q of the heater wiring 231, and the heater film 232 covers the entire surface of the display region 5 in plan view. Thus, as in the third exemplary embodiment, heat generation by the heater film 232 uniformly occurs over the entire surface of the display region 5, and thus it is possible to suppress uneven heat generation in the display region 5.

In the fourth exemplary embodiment, although not particularly illustrated, the heater film 232 is sandwiched between the refractive films 251 and 252 similar to those of the third exemplary embodiment. Therefore, also in the fourth exemplary embodiment, a decrease in contrast ratio can be suppressed, and a decrease in display quality can be suppressed.

Similarly to the fourth exemplary embodiment, the opening portions Slt may be provided at the intersecting portions 231d and 231e as in the first modification of the third exemplary embodiment. When the opening portions Slt are provided at the intersecting portions 231d and 231e, ultraviolet rays enter the sealing material 40 through the opening portions Slt in the case where the ultraviolet curable resin is used as the sealing material 40, and thus curing of the sealing material 40 can be promoted.

The above-described first exemplary embodiment, second exemplary embodiment, third exemplary embodiment, and fourth exemplary embodiment (hereinafter, referred to as "exemplary embodiments, etc.") can be applied and modified as follows.

In the exemplary embodiment, etc., the liquid crystal panel in which the liquid crystal 50 as the electro-optical layer is sandwiched between the counter substrate 20 and the element substrate 30 has been described as an example of the electro-optical device 10. However, for example, the disclosure can be applied to an organic light emitting diode (OLED) device using an organic light emitting layer as the electro-optical layer. In the OLED device, for example, a sealing substrate for sealing is bonded to an element substrate at which a pixel electrode, an organic light emitting layer, and a common electrode are sequentially formed, and a light blocking film and a heater are provided at the sealing substrate in the same manner as in the exemplary embodiment, etc. In this configuration, the sealing substrate is an example of the second substrate.

In the exemplary embodiment, etc., the convex lens 211 and the concave lens 212 are provided as the configuration of the microlens array, but the disclosure is not limited thereto. For example, a configuration in which at least one or more convex lenses 211 and at least one or more concave lenses 212 are provided, a configuration in which at least one or more convex lenses 211 are only provided, or a configuration in which at least one or more concave lenses 212 are only provided may be adopted. Further, the order of the convex lens 211 and the concave lens 212 may be changed.

Supplementary Description

For example, the following aspects of the present disclosure are understood from the embodiments illustrated above.

An electro-optical device according to an aspect (one aspect) includes a first substrate, an electro-optical layer, and a second substrate disposed opposite to the first substrate via the electro-optical layer, wherein the second substrate includes a light blocking member disposed outside a display region in plan view, and a heating member overlapping with the light blocking member in plan view, the heating member including at least a first heating portion disposed along one side of the second substrate and a second heating portion disposed along another side opposite to the one side of the second substrate. According to this aspect, it is possible to suppress uneven heating of the display region.

In the electro-optical device according to a specific aspect 2 of the aspect 1, the heating member has, in a portion overlapping with the light blocking member in plan view, a width narrower than a width of the light blocking member. According to the aspect 2, the heating member does not affect the light blocking property of the light blocking member.

In the electro-optical device according to a specific aspect 3 of the aspect 1, the heating member includes a transparent electrode overlapping with the display region in plan view, and a refractive film disposed at at least one of a first surface or a second surface of the transparent electrode intersecting a thickness direction of the second substrate. According to the aspect 3, the transparent electrode can uniformly heat the display region.

In the electro-optical device according to a specific aspect 4 of the aspect 3, the refractive film is provided between the transparent electrode and an insulating layer, a refractive index of the insulating layer is 1.45 or more and less than 1.70, a refractive index of the refractive film is 1.50 or more and less than 1.80, and a refractive index of the transparent electrode is 1.80 or more and less than 2.00. According to the aspect 4, it is possible to suppress a decrease in transmittance due to the transparent electrode.

In the electro-optical device according to a specific aspect 5 of the aspect 1, includes a first flexible substrate electrically coupled to a first coupling portion disposed at the first substrate, and a second flexible substrate electrically coupled to the heating member via a second coupling portion disposed at the second substrate.

In the electro-optical device according to a specific aspect 6 of the aspect 5, the first coupling portion is disposed at one side outside a rectangle in which the first substrate and the second substrate overlap with each other in plan view, and the second coupling portion is disposed outside the rectangle in plan view and on another side excluding the one side.

In the electro-optical device according to a specific aspect 7 of the aspect 6, wiring is disposed at the second flexible substrate, the wiring being configured to apply a constant voltage to the heating member.

In the electro-optical device according to a specific aspect 8 of the aspect 7, includes a temperature sensor, wherein a constant voltage corresponding to a detection value of the temperature sensor is applied to the wiring of the second flexible substrate. According to the aspect 8, it is possible to control heating of the electro-optical device according to the detection value of the temperature sensor.

In the electro-optical device according to a specific aspect 9 of the aspect 5, the other side is a side opposed to the one side of two sides opposed to each other outside the rectangle in plan view.

In the electro-optical device according to a specific aspect 10 of the aspect 5, the other side is a side intersecting with the one side in plan view.

An electro-optical device according to another aspect (aspect 10) includes a first substrate, a second substrate, and a sealing material disposed outside a display region in plan view and disposed between the first substrate and the second substrate, wherein the second substrate includes a light blocking member disposed outside the display region and inside the sealing material in plan view, and a heating member overlapping with the light blocking member in plan view, the heating member including at least a first heating portion disposed along one side of the second substrate and a second heating portion disposed along another side opposite to the one side of the second substrate.

An electronic apparatus according to an aspect 12 includes the electro-optical device according to any one of aspects 1 to 11.

What is claimed is:
1. An electro-optical device comprising:
a first substrate;
an electro-optical layer; and
a second substrate disposed opposite to the first substrate via the electro-optical layer, wherein
the second substrate includes:
  a light blocking member disposed outside a display region in plan view; and
  a heating member overlapping with the light blocking member in plan view, the heating member including at least a first heating portion disposed along one side of the second substrate and a second heating portion disposed along another side opposite to the one side of the second substrate, and
the heating member includes a portion overlapping with the light blocking member in plan view, the portion having a width narrower than a width of the light blocking member.

2. The electro-optical device according to claim 1, wherein
the heating member includes:
  a transparent electrode overlapping with the display region in plan view; and
  a refractive film disposed at at least one of a first surface or a second surface of the transparent electrode intersecting a thickness direction of the second substrate.

3. The electro-optical device according to claim 2, wherein
the refractive film is disposed between the transparent electrode and an insulating layer,
a refractive index of the insulating layer is 1.45 or more and less than 1.70,
a refractive index of the refractive film is 1.50 or more and less than 1.80, and
a refractive index of the transparent electrode is 1.80 or more and less than 2.00.

4. The electro-optical device according to claim 1, comprising:
a first flexible substrate electrically coupled to a first coupling portion disposed at the first substrate; and
a second flexible substrate electrically coupled to the heating member via a second coupling portion disposed at the second substrate.

5. The electro-optical device according to claim 4, wherein
the first coupling portion is disposed at one side outside a rectangle in which the first substrate and the second substrate overlap with each other in plan view, and
the second coupling portion is disposed outside the rectangle in plan view and on another side excluding the one side.

6. The electro-optical device according to claim 5, wherein
wiring is disposed at the second flexible substrate, the wiring being configured to apply a constant voltage to the heating member.

7. The electro-optical device according to claim 6, comprising a temperature sensor, wherein
a constant voltage corresponding to a detection value of the temperature sensor is applied to the wiring of the second flexible substrate.

8. The electro-optical device according to claim 5, wherein
the other side is a side opposed to one side of two sides opposed to each other outside the rectangle in plan view.

9. The electro-optical device according to claim 4, wherein
the heating member includes a third heating portion disposed to intersect the one side of the second substrate in plan view.

10. An electronic apparatus comprising the electro-optical device described in claim 1.

11. An electro-optical device comprising:
a first substrate;
a second substrate; and
a sealing material disposed outside a display region in plan view and disposed between the first substrate and the second substrate, wherein
the second substrate includes:
  a light blocking member disposed outside the display region and inside the sealing material in plan view; and
  a heating member overlapping with the light blocking member in plan view, the heating member including at least a first heating portion disposed along one side of the second substrate and a second heating portion disposed along another side opposite to the one side of the second substrate, and the heating member includes a portion overlapping with the light blocking member in plan view, the portion having a width narrower than a width of the light blocking member.

12. An electro-optical device comprising:
a first substrate;
an electro-optical layer; and
a second substrate disposed opposite to the first substrate via the electro-optical layer, wherein
the second substrate includes:
   a light blocking member disposed outside a display region in plan view; and
   a heating member overlapping with the light blocking member in plan view, the heating member including at least a first heating portion disposed along one side of the second substrate and a second heating portion disposed along another side opposite to the one side of the second substrate, and
the heating member includes:
   a transparent electrode overlapping with the display region in plan view; and
   a refractive film disposed at at least one of a first surface or a second surface of the transparent electrode intersecting a thickness direction of the second substrate.

* * * * *